Patented July 2, 1946

2,403,186

UNITED STATES PATENT OFFICE 2,403,186

HEATING SYSTEM

John H. Leslie, II, Winnetka, Ill., assignor to Stewart-Warner Corporation, Chicago, Ill., a corporation of Virginia Application March 6, 1943, Serial No. 478,262

9 Claims. (Cl. 237—32)

My invention relates generally to heating systems, and more particularly to heating apparatus especially adapted for heating the air supplied to supercharged cabins of airplanes.

Considerable difficulty has been experienced in maintaining the supercharged cabins of airplanes at a comfortable temperature under all conditions of operation, principally because of the wide variations in atmospheric conditions which may be encountered by an airplane during the course of an extended flight. The problem presents additional difficulties if the system is to be applied to military aircraft provided with supercharged cabins, since in such aircraft the possibility of the perforation of the cabin by enemy action must be taken into consideration.

It is an object of my invention to provide an improved heating system and apparatus for aircraft having supercharged cabins, in which a heater of the internal combustion type is utilized as a source of heat.

A further object is to provide an improved heating system and apparatus for an airplane having a supercharged cabin in which a predetermined pressure differential is maintained in a portion of the system for the operation of a heater of the internal combustion type.

A further object is to provide an improved heating system for aircraft having supercharged cabins in which means are provided to compensate for variations in atmospheric pressure and for variations in pressure within the supercharged cabin.

A further object is to provide an improved system and apparatus for the operation of a heater of the internal combustion type employed for heating all of the ventilating air supplied to a supercharged cabin.

A further object is to provide a system and apparatus for the heating of the air supplied to a supercharged cabin, in which the cabin supercharger is utilized for supplying a combustible mixture to the heating apparatus, and in which all of the ventilating air supplied to the cabin passes through the heat exchanger of the heater.

A further object is to provide an improved control apparatus for the air supplied to a supercharged cabin.

Other objects will appear from the following description, reference being had to the accompanying drawings, in which.

It has frequently been the practice in the past to utilize a heater of the internal combustion type for heating air supplied to the cabin of an airplane. In some instances, such heating systems employ a separate auxiliary engine-driven blower for supplying the combustible mixture to the heater and for forcing the ventilating air to be heated past the heat exchanger of the heater, while in other instances rams have been employed for this purpose. As distinguished from these prior art aircraft heating systems, the system of my invention utilizes the air pressure generated by the cabin supercharger as a means for supplying the combustible mixture to the combustion chamber of the apparatus, and the heat exchanger of the heater forms part of the duct for conveying the compressed air from the cabin supercharger to the cabin.

Figure 1:
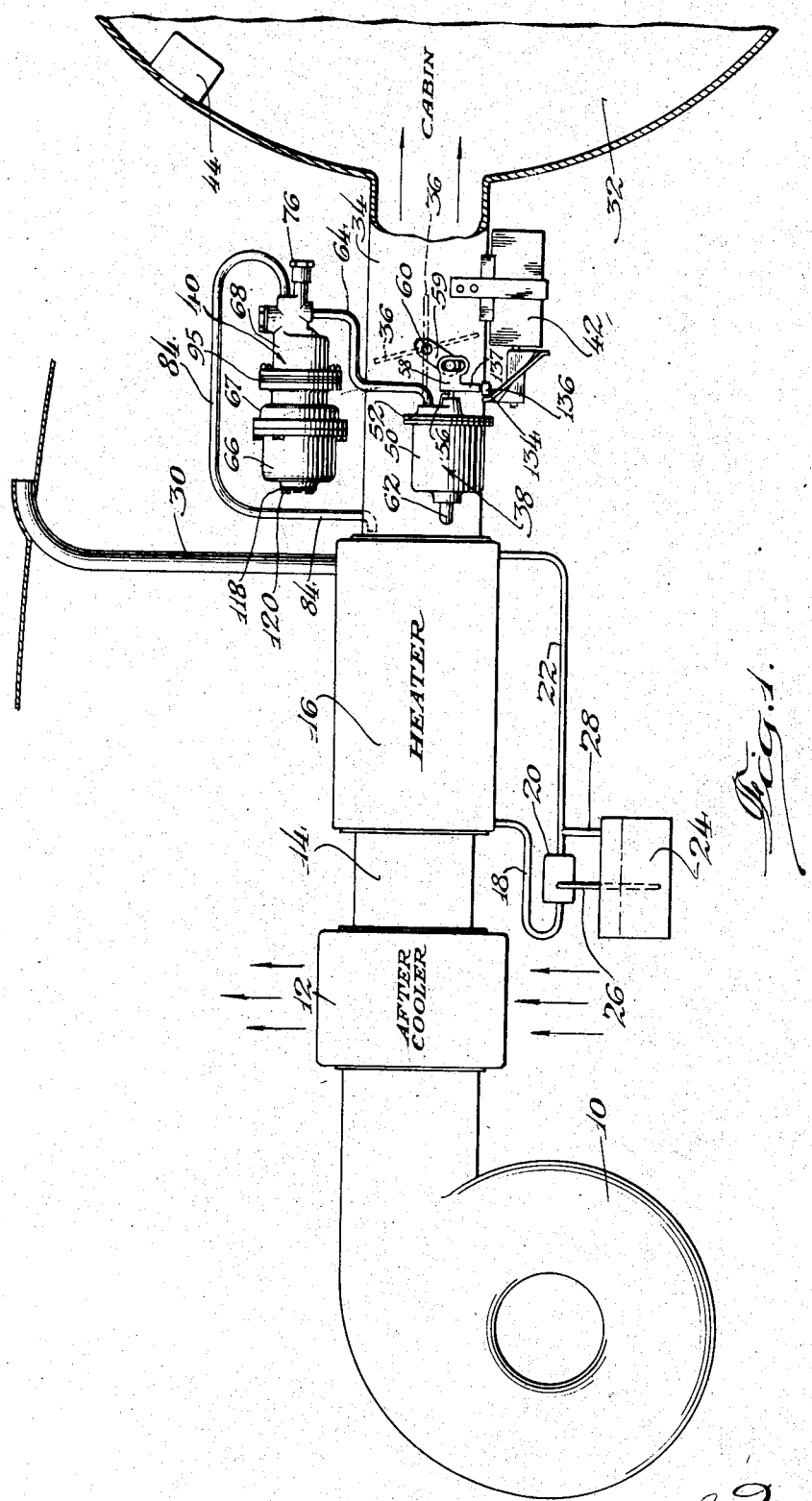
Fig. 1 is a diagrammatic view of the heating system of the invention as applied to heating the air supplied under pressure to a supercharged cabin.

As illustrated generally, and in part diagrammatically, in Fig. 1, the system comprises a supercharger 10, the discharge of which flows through an after-cooler 12, and therefrom through a duct 14 to a heater 16, which is preferably of the internal combustion type, as shown, for example, in the prior application of Henry J. De N. McCollum, Serial No. 447,345, filed June 17, 1942. The heater is supplied with a combustible mixture through a conduit 18 connected to a carburetor 20. The carburetor receives air under pressure from a conduit 22 connected to a small scoop located in the flowing airstream near the discharge end of the heater, the carburetor being supplied with fuel from a suitable fuel tank 24 through a tube 26. A tube 28 is preferably connected between the conduit 22 and the fuel tank 24 to maintain the fuel therein under pressure. Any suitable alternative fuel supply system may be employed.

The products of combustion from the heater are discharged to the atmosphere through an exhaust conduit 30, which preferably terminates at a point at which the pressure is reduced below atmospheric when the airplane is in flight. The ventilating air heated by the heater 16 is conducted to the supercharged cabin 32 of the airplane through a duct 34, the flow through which is controlled by a valve 36, illustrated as of the pivoted butterfly type. This valve is operated by an airmotor 38, which in turn is controlled by a differential pressure responsive valve mechanism 40. The valve 36 may also, under certain conditions, be controlled by a positioning electric motor 42.

The cabin 32 is provided with a diagrammatically illustrated pressure regulating and relief valve 44, by which the pressure in the cabin is controlled with respect to atmospheric pressure and by the operation of which, in an emergency, the air within the cabin may be rapidly vented to the atmosphere when it is desired to reduce the pressure within the cabin to that of the atmosphere. The details of a suitable control valve structure of this type are shown in the copending application of William A. Marshall, Jr., Serial No. 481,209, filed March 31, 1943. In accordance with the teaching of said Marshall application, the valve 44 is adjustable for controlling the altitude at which it becomes active, and the arrangement is such that it does not come into operation until such critical selected altitude is reached.

Figure 2:
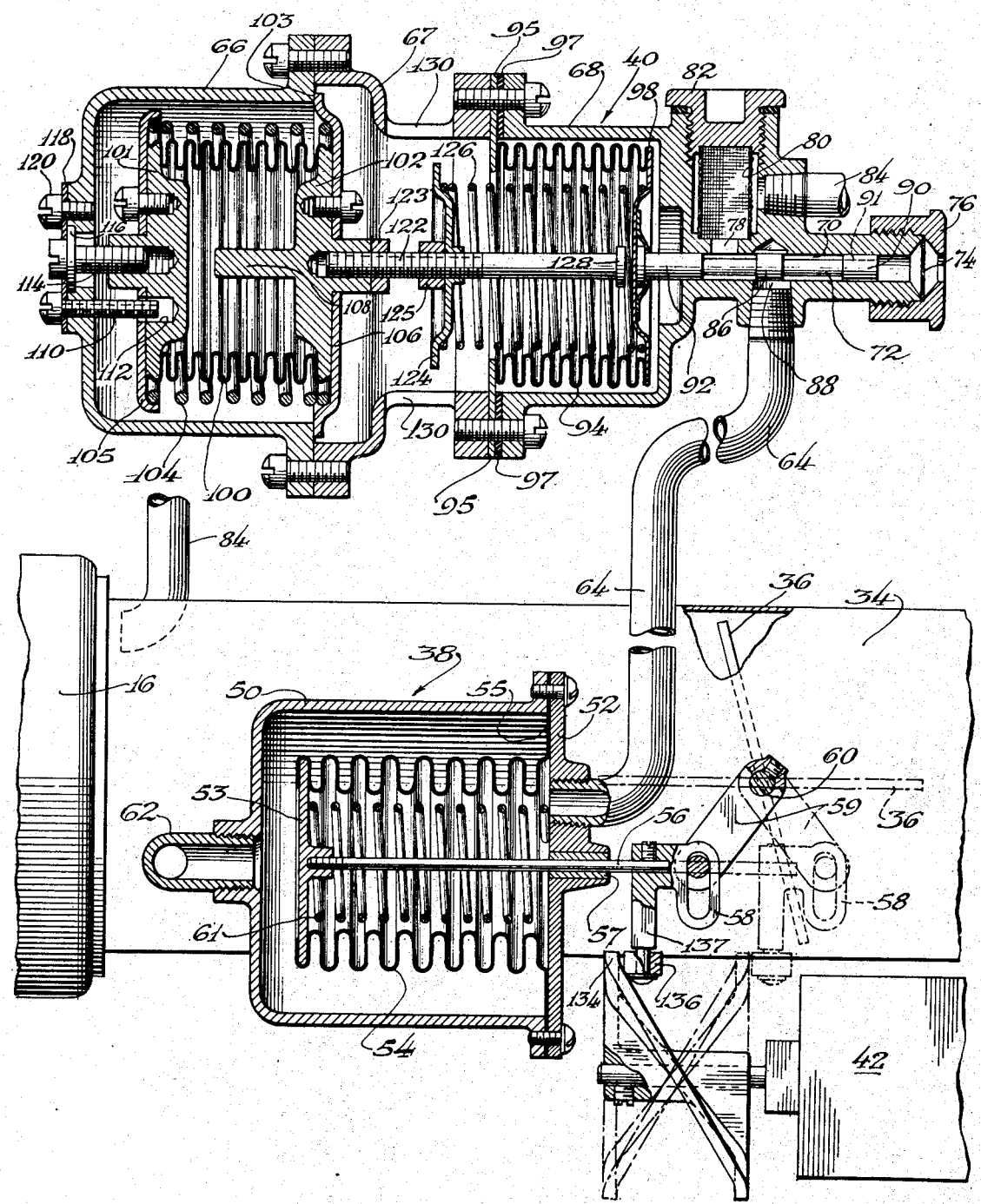
Fig. 2 is a vertical sectional view of the control apparatus for the system of Fig. 1.

As shown in Fig. 2, the air-operated motor 38 comprises a generally cylindrical case 50 closed by a head 52. A bellows 54 has its flange 55 clamped between the case 50 and head 52, and has an actuating rod 56 secured to its movable end plate 53, this rod extending through a suitable stuffing box 57 and having a crosshead member 58 secured thereto. The member 58 forms part of a pin and slot connection between the rod 56 and a lever 59. The lever 59 is secured to the pintle 60 of the valve 36. A coil spring 61 is compressed between the end plate 53 and the head 52.

The space between the bellows 54 and the case 50 is connected to the duct 34, at a point between the heater and the valve 36, by an elbow fitting 62, while the interior of the bellows 54 is connected to the valve mechanism 40 by a conduit 64.

The valve mechanism 40 comprises a housing formed by three sections, 66, 67, and 68, respectively, suitably secured together to form a rigid unit. The section 68 includes a cylindrical valve chamber 70 within which a spool valve 72 is reciprocable. Air is admitted from the atmosphere to one end of the chamber 70 through a screen 74 held in place by an apertured cap 76. Air under pressure is supplied to the other end of the chamber 70 through a port 78. A cylindrical screen 80 is held in place around the port 78 by a plug 82, and air under pressure is supplied to the port 78 through the screen 80 by a conduit 84. The conduit 84 is connected to the duct 34 at a point between the heater 16 and the valve 36.

The spool valve 72 has an enlarged portion 86 which controls the air flow into and out of a port 88 communicating with the conduit 64. An enlarged end portion 90 of the spool valve 72 forms a guide for the latter, and is provided with a slot 91, while an enlarged portion 92 of this valve fits sufficiently loosely in the valve cylinder 70 that air may leak past it and that the pressure within the section 68 will gradually equalize with that within the valve cylinder 70 at its left-hand end (Fig 2). If desired, a groove might be provided in the wall of the housing section 68 next to the valve portion 92 for permitting the desired restricted pressure effect therethrough.

A differential bellows 94 has its open end plate 95 clamped between adjacent flanges of sections 67 and 68, and is sealed against the end of section 68 by a suitable gasket 97. A closed end plate 98 of the bellows 94 is suitably secured to the spool valve 72. An aneroid or isobaric bellows 100, within the section 66, has sealed end plates 101 and 102. A coil spring 104 is compressed between spring seats 105 and 106, which are secured to the end plates 101 and 102, respectively. The spring 104 is provided to oppose constriction of the bellows 100 under the influence of atmospheric pressure. The end plate 102 is provided with an internal projection 108 which cooperates with end plate 101 to limit the extent of collapsing movement of the bellows prior to its assembly with the associated parts. The edge portion of the spring seat 106 abuts against a shoulder 103 of the housing section 66 so as to limit contraction of the bellows after its assembly in the valve. The bellows 100 is so designed that it will not move the spring seat 106 from the shoulder 103 until the pressure of the atmosphere surrounding the bellows drops to 12" Hg, which is the normal atmospheric pressure at an altitude of about 23,000 feet.

The bellows 100 is prevented from rotating in the section 66 by a stud 110, the end of which projects freely into a socket 112 formed in the spring seat 105 and end plate 101. The end plate 101 is secured in adjusted position with repect to the housing section 66 by a cap screw 114 threaded in the end plate and having a flange 116 frictionally secured by a locking plate 118, the latter being held by screws 119 and 120.

The end plate 102 is tapped to receive the threaded end of a rod 122, the rod being locked in adjusted position by a lock nut 123. A spring seat 124 is likewise adjustably threaded on the rod 122, being locked in adjusted position by a lock nut 125. A spring 126 is compressed between the spring seat 124 and the end plate 98. The rod 122 terminates in a head 128 which may engage the end plate 98 at high altitudes. The section 67 has vent and access apertures 130 through which a tool may be inserted for convenience in adjusting the rod 122 in the end plate 102, and for adjustment of the position of spring seat 124 on the rod 122.

The positioning electric motor 42 is adapted to be remotely controlled to position a cam 134, the latter being engageable with a roller 136 on an arm 137 projecting from the member 58 and thus being operable by rotation of the cam 134 through 180°. Opening the valve 36 by energization of the motor 42 is desirable, for example, when the plane is cruising at low altitude in warm weather. Under such circumstances the heater may not be in operation, but minimum back pressure is desired because of the heat of compression from the cabin supercharger. That is, the aftercooler normally will remove the major portion of the heat of compression from the supercharger, but it cannot, of course, be 100% efficient. Therefore any back pressure on the supercharger at low altitudes under high temperature conditions will result in some heating of the cabin, which is objectionable.

One of the primary purposes of the apparatus is to maintain a sufficiently high pressure differential between the portion of the duct 34 upstream of the valve 36 and the atmosphere to assure proper operation of the heater.

Figure 3:
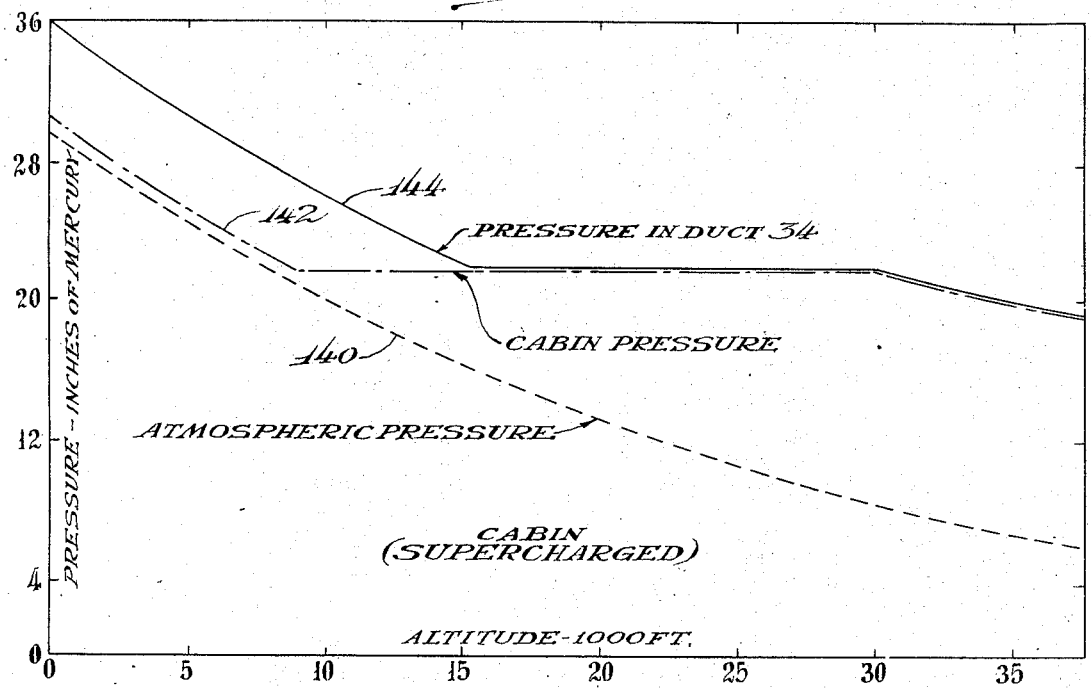
Fig. 3 is a graph showing the duct pressures at various altitudes when the cabin is supercharged.

The general principles of the operation of the apparatus will be described with reference to the graphs of Figs. 3 and 4. Referring to Fig. 3, the curve 140 represents the atmospheric pressure at the different altitudes, while the curve 142 represents the cabin pressure at different altitudes. It will be noted that the cabin pressure is maintained slightly above atmospheric pressure until a pressure corresponding to an altitude of 8,000 feet is attained. At this pressure, approximately 22" Hg, the cabin pressure controls of the supercharger system (including valve 44) become effective and by controlling the opening through the valve 44 maintain the pressure within the cabin at 22" Hg until an altitude of about 30,000 feet is reached. At this altitude, the limit of the cabin supercharging system is normally attained, and thereafter the cabin pressure is maintained at a pressure of approximately 13" Hg above atmospheric pressure until the plane's ceiling is reached.

It is desirable, for most efficient operation of the heater, that the pressure in the portion of the duct 34 upstream of the valve 36 be maintained substantially above atmospheric pressure. For the purpose of this description, it is assumed that a pressure differential of 6" Hg between the duct pressure and the atmosphere is desirable, and thus that the controls for the butterfly valve 36 including the spring 126 as hereinafter noted are adjusted to maintain this pressure differential. Under these circumstances, the pressure in the portion of the duct 34 upstream of the valve 36 will follow the curve 144. It will be noted that from zero altitude to an altitude of 16,000 feet, the curve 144 shows that the pressure in the upstream portion of the duct 34 is maintained above atmospheric pressure by 6" Hg. Obviously the pressure in the upstream portion of the duct 34 cannot be lower than that in the cabin, and thus at altitudes above 16,000 feet the pressure in the upstream portion of the duct 34 will be substantially the same as that in the cabin, and therefore the curves 142 and 144 substantially coincide at altitudes above 16,000 feet.

The operation of the mechanism by which the pressures represented by the curve 144 are maintained will now be described.

At zero altitude, with an atmospheric pressure of 30" Hg, the spring 61 tends to expand the bellows 54 and move the butterfly valve 36 toward closed position and thereby to restrict the flow through the duct 34 and increase the pressure within the duct. This tendency is opposed since as the pressure within the upstream portion of the duct 34 increases, this increased pressure acts upon the external surface of the bellows 54 through the elbow 62 and tends to collapse it, thus tending to move the butterfly valve 36 toward open position, but the external pressure on bellows 54 is opposed by the internal pressure on the bellows and the latter is controlled by the pilot valve 86.

As the pressure in the upstream portion of the duct 34 increases, this pressure is transmitted through the conduit 84 and hence through the port 78 and the space between the stem 92 and bore 70, so as to be exerted upon the external surface of the differential bellows 94, tending to compress the latter. (The interior of bellows 94 is at all times in free communication with the atmosphere.) Such movement of the bellows 94 causes the spool valve 86 to move toward the left in Fig. 2 and thus decrease the size of the opening connecting the port 88 with the port 78 and increase the size of the opening connecting the port 88 to the atmosphere. As a result, the pressure within the air motor bellows 54 will tend to decrease. Such decreased pressure within the bellows 54 is reflected in contraction of this bellows and consequent movement of the valve 36 further toward full open position.

For accomplishing the desired result, the degree of compression of the spring 126 on the differential bellows 94 is adjusted so that the pilot valve 86 will maintain the pressure in the upstream portion of the duct 34 at approximately 6" Hg above atmospheric pressure. The clearance between the valve portion 92 and its cylinder 70 is such as to form a sufficient restriction to the flow of the air into and from the differential bellows housing section 68 that there will be no pronounced hunting of the butterfly valve 36, but instead, it will be moved smoothly and gradually to the position necessary to maintain a 6" Hg differential pressure between the upstream portion of the duct 34 and the atmosphere. The bellows 94, being responsive to the difference between the pressure in duct 34 and the atmosphere, operates to maintain this 6" Hg differential pressure, and thus will be effective to cause the duct pressure to drop as the atmospheric pressure drops, until the plane reaches 16,000 feet.

When the plane attains an altitude of approximately 16,000 feet, the cabin, due to the operation of the cabin supercharger controls, will likewise have a pressure of 6" Hg above atmospheric pressure, such controls functioning independently of the valves 36 and 40 in the manner set forth in said prior application Serial No. 481,209. As is apparent from Fig. 3, this pressure differential increases from the 16,000 foot altitude to an altitude of approximately 30,000 feet.

The pressure in the upstream portion of the duct 34 after the plane has reached an altitude of 16,000 feet being more than 6" Hg above atmospheric pressure, the differential bellows 94 will be compressed sufficiently against the action of the spring 126 to move the pilot valve 86 to the left and cut off or substantially cut off the flow of air from the port 78 to the port 88, and instead, the port 88 will be connected substantially freely to the atmosphere. The air motor bellows 54 will therefore be compressed by the pressure through the elbow 62 from the duct 34 and hold the butterfly valve 36 in full open position. The operation of the heater is not materially affected when the pressure in the duct 34 exceeds atmospheric pressure by more than 6" Hg, as is the case when the plane attains an altitude above 16,000 feet. Above 16,000 feet the pressure in the duct 34 will thus remain substantially the same as that in the cabin until the plane's ceiling is reached.

When the plane attains an altitude of about 23,000 feet, the aneroid bellows 100 expands against the decreased atmospheric pressure, serving to press the head 128 of the rod 122 against the end plate 98 of the bellows 94 and to press the valve 86 toward the right in Fig. 2 for opening the passageway from the port 78 to the port 88, in case such passageway is not already open. This insures that the pressure in the duct 34 shall be applied through the pipes 84 and 64 to the interior of the bellows 54 for expanding such bellows so as to move the actuating rod 56 toward the left for adjusting the valve 36. Under these conditions, with the bellows 100 because of its expansion controlling the position of the valve 36, the bellows 94 loses control until the plane has descended again below the critical altitude at which the bellows 100 became effective.

Whenever, due to perforation of the cabin by enemy action, or for any other reason, the cabin pressure drops to a value less than 6" Hg above atmospheric pressure, the differential bellows 94 by positioning the pilot valve 86 will control the air motor bellows 54 to again adjust the position of the valve 36 to maintain the 6" Hg differential pressure, unless control has already been taken over by the bellows 100. This adjustment of the valve 36 under the circumstances stated is effected by reason of the drop in back pressure in the duct 34 when the pressure in the cabin is cut down, such drop in back pressure in the duct being applied through the pipe 84 to the bellows 94 so as to permit the spring 126 to expand the bellows 94 for moving the valve 86 toward the right in said Fig. 2 and thus applying the pressure through the pipes 84 and 64 for expanding the bellows 54 and drawing the actuating rod 56 toward the left in Fig. 2.

In my improved arrangement, if the pressure in the cabin under the control of the valves 36 and 40 becomes excessive, such pressure is relieved by the action of the valve 44. If, on the other hand, the valve 44 closes so as to build up unduly high pressure in the cabin and the duct 34, then the valve 36 is moved so as to have a tendency to lower the pressure in the duct. Since the valves 44 and 36 are not connected, either of the results can be effected by one of said mechanisms entirely independently of the condition of the other mechanism.

Figure 4:
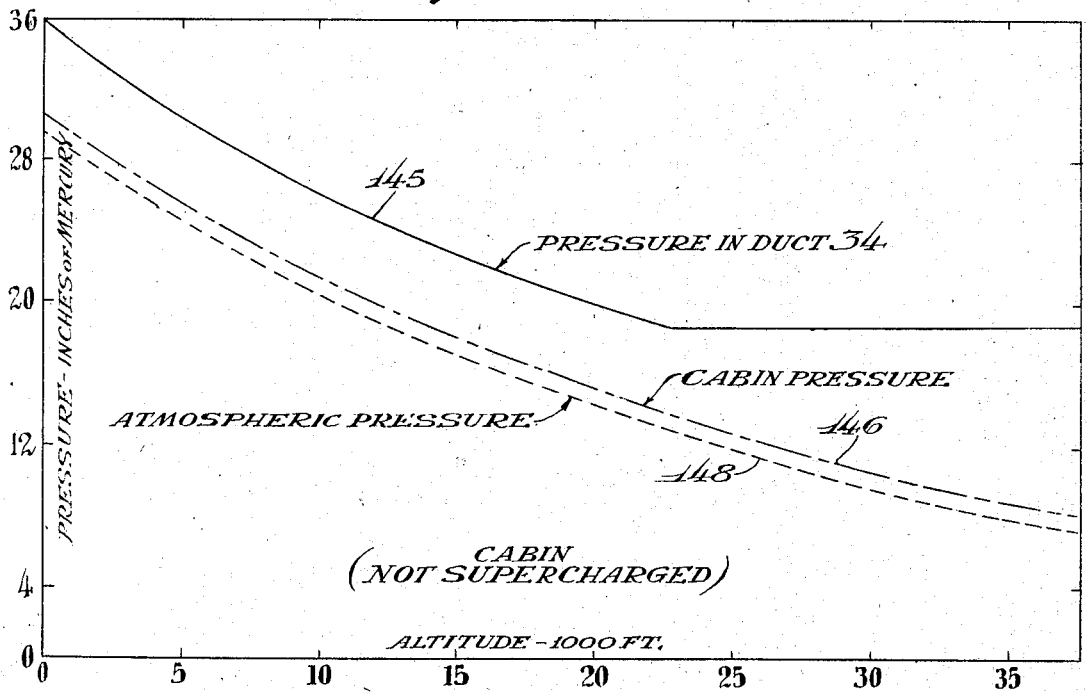
Fig. 4 is a graph showing the duct pressures at various altitudes when the cabin is not supercharged.

The curve 145 of Fig. 4 shows the pressure in the upstream portion of the duct 34 at various altitudes when the cabin is not being supercharged. When the plane is engaged in military action, it is usually desirable to vent the cabin to the atmosphere. However, the supercharger remains in operation, and, due to the resistance to escape of air from the cabin through its vent valve, the pressure in the cabin will ordinarily be somewhat above atmospheric pressure, as indicated by the fact that the curve 146, representing the cabin pressure, is spaced somewhat above the curve 148, representing the atmospheric pressure.

The pressure in the upstream portion of the duct 34 will be controlled by the differential bellows 94 in the manner previously described, so as to maintain this portion of the duct 34 at a pressure 6" Hg above atmospheric pressure until the plane attains an altitude of approximately 23,000 feet. As the atmospheric pressure approaches 12" Hg, the normal pressure at 23,000 feet, the isobaric bellows 100 expands, the flange of its spring seat 196 leaves the shoulder 103, and the head 128 on the stem 122 engages the end plate 98 and thereby takes over from the bellows 94 the sole control of the position of the pilot valve 86 in the following manner. The bellows 94 and 100 are of the same diameter. Thus, when the head 128 is in contact with the end plate 98, atmospheric pressure has no effect upon the movement of these bellows, since it applies equal forces in opposite directions to the two bellows. Under these circumstances, it is only the absolute pressure in the duct 34 (as applied to the external surfaces of bellows 94) balanced against spring 104 that has any controlling effect, and which thus determines the position of the pilot valve 86.

The valve 36 is so constructed or provided with a suitable stop that it cannot be moved to fully closed position; rather it is arrested at a position approximately 15° from the fully closed position. Surging of the supercharger is thus prevented.

From the foregoing it will appear that whether the cabin is supercharged or not, a pressure differential of at least 6" Hg is maintained between the upstream portion of the duct 34 and the atmosphere down to 18" Hg duct pressure, after which the upstream portion of the duct pressure is kept constant at 18" Hg. The pressure differential thus produced is adequate for satisfactory operation of the heater.

An additional beneficial result brought about by placing the valve 36 downstream of the heater 16 is that the ventilating air pressure within the heater is always maintained above the pressure of the products of combustion. The result is that any leakage or perforation which develops in the heat exchanger will cause ventilating air to leak into the space occupied by the products of combustion rather than in the opposite direction, which would contaminate the ventilating airstream. If the perforation becomes so serious that the ventilating airstream pressure and the pressure of the products of combustion within the heater become equalized, combustion will be extinguished and thus no burned gases will be mixed with the ventilating airstream even under these extremely abnormal conditions.

It will be understood that it is difficult to design the heater to burn gasoline at very low absolute air pressure unless the proper mixture ratio is maintained with a high degree of accuracy. Since it is not always feasible or possible to maintain the mixture ratio constant, it is desirable, in order to assure continued combustion within the heater, to maintain the combustion air supplied to the heater above a certain absolute pressure, as, for example, 18" Hg. It will be clear from a consideration of the curves of Figs. 3 and 4 that this condition is obtained by the apparatus disclosed.

Suitable thermostatic controls may be provided to energize the motor 42 to move the valve 36 to full open position whenever the heater is not in operation.

By adjustment of the position of plate 101 of the isobaric bellows 100, by means of screw 114, the atmospheric pressure at which this bellows assumes its control function may be varied. Similarly, by adjustment of the degree of compression of spring 126, by shifting the spring seat 124, an adjustment of the differential pressure maintained between duct and atmospheric pressures may be obtained.

While I have shown and described a particular embodiment of my invention, it will be apparent to those skilled in the art that numerous variations and alterations may be made in the specific form of the apparatus without departing from the underlying principles of the invention. I therefore desire, by the following claims, to include within the scope of my invention all such modifications and variations by which substantially the results of the invention may be obtained by the use of substantially the same or equivalent means.

I claim:

1. In a heating system for airplanes equipped with cabins supplied with air under pressure from a supercharger through a duct, a heater of the internal combustion type receiving its combustion air from said duct and having the products of combustion exhausting to the atmosphere, means for maintaining a substantially uniform difference between the pressure in said duct and atmospheric pressure, comprising, a valve in said duct adjacent the cabin end thereof, a bellows having one side thereof subjected to atmospheric pressure and the other side thereof subjected to the pressure in said duct, and motor means controlled by said bellows and operable to determine the position of said valve.

2. In an airplane heating system, the combination of a cabin supercharger, a duct leading therefrom, a heater of the internal combustion type having a heat exchanger in said duct and receiving air for combustion from said duct, means for discharging the products of combustion from said heater to the atmosphere, a valve in said duct beyond said heater so as to control the pressure in the portion of the duct in which said heater is located, and means responsive to the difference in pressure in said duct and the atmosphere for controlling the position of said valve and thereby maintaining a predetermined pressure difference throughout a wide range of atmospheric pressure variation.

3. In an aircraft heating system, the combination of a supercharger, a duct connecting said supercharger to a space to be supercharged, a heater of the internal combustion type having a combustion air inlet connected to said duct, having an exhaust conduit connected to the atmosphere for discharging the products of combustion, and having a heat exchanger located in said duct for heating the air supplied by said supercharger, a flow restriction valve in said duct beyond said heater, means responsive to the difference between the pressure in said duct and atmospheric pressure, an air motor for operating said valve, and valve means operated by said pressure responsive means for controlling the operation of said air motor.

4. In a heating system for airplanes equipped with cabins supplied with air under pressure from a supercharger through a duct, a heater of the internal combustion type receiving its combustion air from said duct and having the products of combustion exhausting to the atmosphere, means for maintaining a substantially uniform pressure difference between said duct and the atmosphere throughout a predetermined range of atmospheric pressure and maintaining the pressure in said duct at a constant absolute pressure beyond said range, comprising, a valve in said duct adjacent the cabin end thereof, a bellows having one side thereof subjected to atmospheric pressure and the other side thereof subjected to the pressure in said duct, motor means controlled by said bellows and operable to determine the position of said valve, and an aneroid device operative to render said bellows ineffective and to assume control of said motor means when the atmospheric pressure is lower than the pressures included in said predetermined pressure range.

5. In a heating system for an airplane having a cabin, the combination of a cabin supercharger, a duct leading therefrom to the cabin, a heater of the internal combustion type having a heat exchanger in said duct and receiving air for combustion from said duct, means for discharging the products of combustion from said heater to the atmosphere, a valve in said duct between said heater and said cabin to control the pressure in the portion of the duct in which said heater is located, means responsive to the pressure difference between said duct and the atmosphere for controlling the position of said valve and thereby maintain said pressure difference substantially constant throughout a predetermined range of atmospheric pressure, and means responsive to atmospheric pressure for rendering said pressure difference responsive means ineffective when the atmospheric pressure drops below a predetermined minimum value.

6. In a heating system for airplanes equipped with cabins supplied with air under pressure from a supercharger through a duct, a heater of the internal combustion type receiving its combustion air from said duct and having the products of combustion exhausting to the atmosphere, means for maintaining a substantially uniform difference between the pressure in said duct and the atmospheric pressure, comprising, a valve in said duct adjacent the cabin end thereof, a bellows having one side thereof subjected to atmospheric pressure and the other side thereof subjected to the pressure in said duct, air motor means for operating said valve, and pilot valve means operated by said bellows to control the admission of air under pressure to said air motor means.

7. The combination set forth in claim 6 in which the air under pressure for the operation of said air motor means is supplied from said duct under the control of said pilot valve.

8. In a heating system for airplanes equipped with cabins supplied with air under pressure from a supercharger through a duct, a heater of the internal combustion type receiving its combustion air from said duct and having the products of combustion exhausting to the atmosphere, means for maintaining a substantially uniform difference between the pressures in said duct and in the atmosphere throughout a predetermined atmospheric pressure range and for maintaining a definite absolute pressure in said duct at atmospheric pressures below said range, comprising a valve for controlling the flow of air from said duct to the cabin, motor means for positioning said valve, and means to control said motor means, comprising an aneroid bellows and a bellows responsive to the pressure difference between said duct and the atmosphere.

9. In an airplane heating system, the combination of a cabin supercharger, a duct leading therefrom, a heater of the internal combustion type having a heat exchanger in said duct and receiving air for combustion from said duct, means for discharging the products of combustion from said heater to the atmosphere, a valve in said duct beyond said heater so as to control the pressure in the portion of the duct in which said heater is located, means responsive to the difference in pressure in said duct and the atmosphere for controlling the position of said valve and thereby maintain said pressure difference substantially throughout a substantial range of atmospheric pressure variation, and additional means responsive solely to atmospheric pressure for controlling said valve to maintain the air in said duct at a predetermined substantially constant pressure whenever the atmospheric pressure is below a predetermined value.

JOHN H. LESLIE, II.